US009054850B2

(12) United States Patent
Dui et al.

(10) Patent No.: US 9,054,850 B2
(45) Date of Patent: Jun. 9, 2015

(54) METHOD AND DEVICE FOR SENDING DATA IN PASSIVE OPTICAL NETWORK

(71) Applicant: Huawei Technologies Co., Ltd., Shenzhen (CN)

(72) Inventors: Kai Dui, Wuhan (CN); Guang Xie, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 14/095,713

(22) Filed: Dec. 3, 2013

(65) Prior Publication Data

US 2014/0093243 A1 Apr. 3, 2014

Related U.S. Application Data

(63) Continuation of application No. PCT/CN2011/075269, filed on Jun. 3, 2011.

(51) Int. Cl.
*H04B 10/00* (2013.01)
*H04L 7/00* (2006.01)
*H04Q 11/00* (2006.01)
*H04J 3/06* (2006.01)

(52) U.S. Cl.
CPC .......... *H04L 7/0075* (2013.01); *H04Q 11/0067* (2013.01); *H04Q 2011/0064* (2013.01); *H04J 3/0608* (2013.01); *H04J 3/0682* (2013.01)

(58) Field of Classification Search
USPC .................................................. 398/66–72
See application file for complete search history.

(56) References Cited

U.S. PATENT DOCUMENTS

| | | | |
|---|---|---|---|
| 7,983,308 B1 * | 7/2011 | Johnston et al. | 370/514 |
| 7,991,296 B1 * | 8/2011 | Johnston et al. | 398/154 |
| 8,014,481 B1 * | 9/2011 | Chiang et al. | 375/355 |
| 8,406,633 B1 * | 3/2013 | Johnston et al. | 398/154 |
| 8,634,431 B1 * | 1/2014 | Chiang et al. | 370/412 |

(Continued)

FOREIGN PATENT DOCUMENTS

| | | |
|---|---|---|
| CN | 101252388 A | 8/2008 |
| CN | 102056031 A | 5/2011 |

OTHER PUBLICATIONS

Doo, et al., "Design of a Retimed Long-Reach GPON Extender using FPGA," 2010 9th International Conference on Optical Internet (COIN), IEEE, Jul. 11, 2010, 4 pages.

(Continued)

*Primary Examiner* — Agustin Bello
(74) *Attorney, Agent, or Firm* — Slater & Matsil, L.L.P.

(57) ABSTRACT

Embodiments of the present invention provide a method and a device for sending data in a passive optical network. A central office processing device records a downstream superframe number of a downstream data frame. A loop delay between the central office processing device and a terminal processing device is obtained according to the recorded downstream superframe number in combination with an upstream superframe number and an upstream frame synchronization sign in an upstream channel-associated data frame sent by the terminal processing device, so that the central office processing device may, after subtracting the loop delay, accurately determine, by using cached bandwidth map information and an obtained equalization delay of the terminal processing device, a start time point and an end time point for sending an upstream service data frame to an optical line terminal.

20 Claims, 9 Drawing Sheets

(56) References Cited

U.S. PATENT DOCUMENTS

| | | | |
|---|---|---|---|
| 8,718,087 B1* | 5/2014 | Johnston et al. | 370/463 |
| 2009/0175619 A1 | 7/2009 | Effenberger et al. | |
| 2010/0272436 A1* | 10/2010 | Mizutani et al. | 398/25 |
| 2011/0013903 A1* | 1/2011 | Rafel Porti et al. | 398/1 |
| 2012/0063774 A1* | 3/2012 | Niibe et al. | 398/34 |
| 2012/0141139 A1* | 6/2012 | Bakhru et al. | 398/158 |
| 2012/0224858 A1 | 9/2012 | Chen et al. | |
| 2014/0093243 A1* | 4/2014 | Dui et al. | 398/58 |
| 2014/0105597 A1* | 4/2014 | Bernard et al. | 398/35 |

OTHER PUBLICATIONS

International Search Report and Written Opinion received in Application No. PCT/CN2011/075269 mailed Mar. 15, 2012, 10 pages.

Series G: Transmission Systems and Media, Digital Systems and Networks, ITU-T, Telecommunication Standardization Sector of ITU, G.709/Y.1331. Amendment 2, Apr. 2011, 30 pages.

Series G: Transmission Systems and Media, Digital Systems and Networks, ITU-T, Telecommunication Standardization Sector of ITU, G.984.3, Amendment 2, Nov. 2009, 18 pages.

Series G: Transmission Systems and Media, Digital Systems and Networks, ITU-T, Telecommunication Standardization Sector of ITU, G.984.6, Amendment 1, Nov. 2009, 28 pages.

Thoguluva, J. et al., "Frame-level OEO-Regenerating GPON Reach Extender," OSA/OFC/NFOEC, Date of Conference Mar. 6-10, 2011, 3 pages.

* cited by examiner

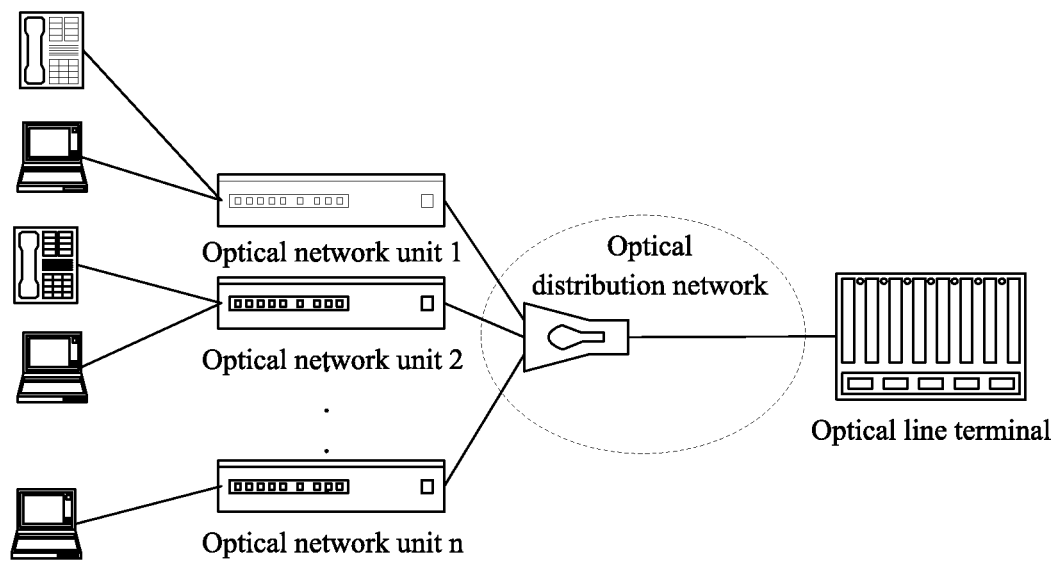
FIG. 1-a
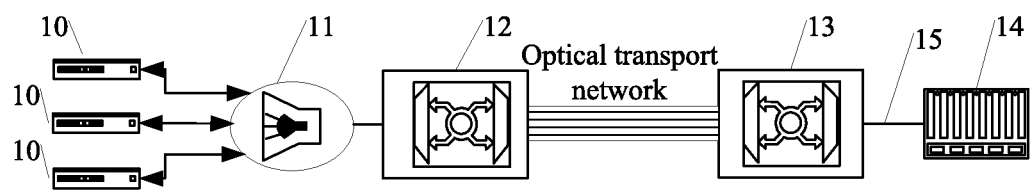
FIG. 1-b

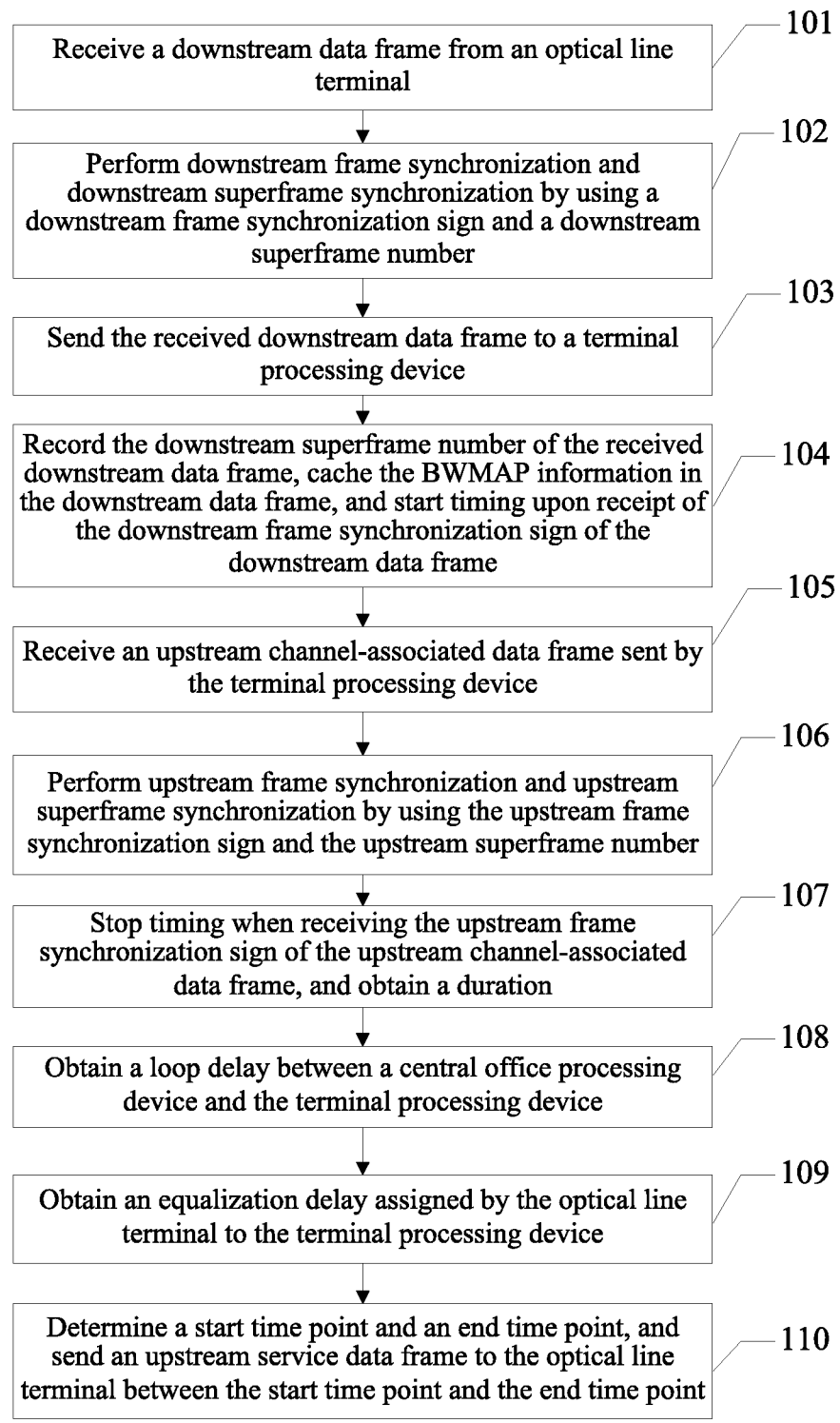
FIG. 1-c

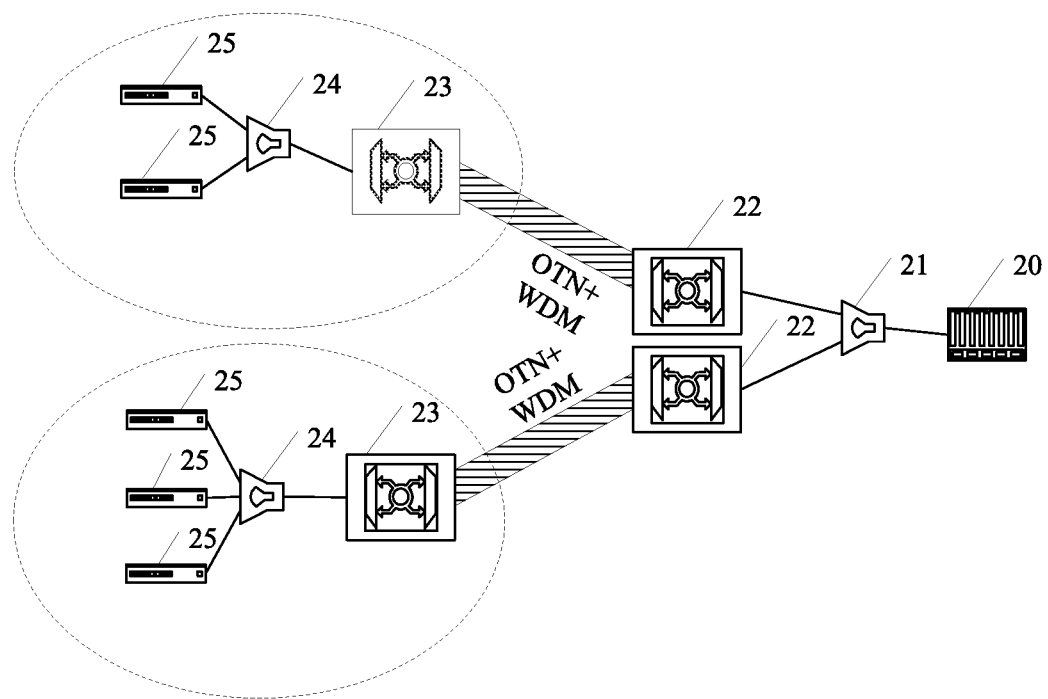
FIG. 1-d

METHOD AND DEVICE FOR SENDING DATA IN PASSIVE OPTICAL NETWORK

This application is a continuation of International Application No. PCT/CN2011/075269, filed on Jun. 3, 2011, which is hereby incorporated by reference in its entirety.

TECHNICAL FIELD

The present invention relates to the field of optical communications, and in particular, to a method and a device for sending data in a passive optical network.

BACKGROUND

A passive optical network (PON) technology is one of the most widely applied Fiber To The Home (FTTH) technologies. Mainstream PON standards include gigabit passive optical network (GPON) developed and submitted by the Full Service Access Network (FSAN) organization and formulated by the International Telecommunication Union standardization organization (ITU-T), and Ethernet passive optical network (EPON) formulated by the Institute of Electrical and Electronics Engineers (IEEE) of the United States.

A network architecture of a conventional PON system mainly includes such parts as an optical network unit (ONU), an optical distribution network (ODN), and an optical line terminal (OLT). As shown in FIG. 1-a, a downstream direction is from the OLT to the ONUs through the ODN, where data is transferred in a broadcast manner. A user equipment such as a portable computer or telephone sends upstream data to the OLT through an ONU and the ODN. The upstream data is sent in a manner of using the time division multiple access (TDMA, Time Division Multiple Access) technology. The ODN network uses a passive optical splitter to combine optical signals of the ONUs. Therefore, the ONUs need to stop sending optical signals in unauthorized periods, that is, stop sending data. The upstream data sent by the ONUs is burst data, and only one ONU is allowed to send upstream data at a time. The conventional PON system mainly satisfies access requirements of the last kilometer, where a small number of ONUs are connected to the OLT through the ODN, and a coverage radius is no more than 20 km, resulting in that many OLTs need to be deployed in the system for the conventional network architecture, which increases equipment investment and maintenance costs in one aspect, and increases management and maintenance complexity of the entire system in another aspect.

A long-reach passive optical network (LR-PON) is proposed based on the conventional PON system, and is mainly used to expand the coverage area of a PON system. In the optical transport network (OTN) standard G.709, the LR-GPON based on the GPON system of the OTN has been adopted, and has been partially put into commercial use.

A network architecture of an existing LR-GPON system may be shown in FIG. 1-b. A terminal processing device 12 and a central office processing device 13 are connected between an optical distribution network 11 and an optical line terminal 14 that is deployed in a central equipment room. An optical network unit 10 sends data over the optical distribution network 11. The terminal processing device 12, after converting an upstream burst data stream combined by the optical distribution network 11 into a contiguous data stream, maps the contiguous data stream into an optical transport network protocol frame, and transports the contiguous data stream over a long distance in a manner of combining the optical transport network and wavelength division multiplexing (WDM) technologies. The central office processing device 13 demaps the contiguous data stream in the optical transport network, to recover the contiguous data stream and sends the contiguous data stream to the optical line terminal 14 for processing.

In an existing technical solution, the central office processing device 13 defines, in a manner of determining a data gap in a data stream, a start time point and an end time point for sending data by the central office processing device 13 to the optical line terminal 14. For example, when the central office processing device 13 detects a physical layer overhead upstream (PLOu) in a process of demapping upstream data, the central office processing device 13 starts to send the received upstream data to the optical line terminal 14; and after detecting tens of consecutive bytes of 0s, the central office processing device 13 determines that an upstream burst ends, and stops sending data to the optical line terminal 14.

However, in an actual application, a too long data gap reduces an effective bandwidth. Therefore, a data gap between signals sent to the OLT by adjacent ONUs usually has several bytes only. As a result, a data sending boundary of a single ONU cannot be determined by using the above manner of determining a data gap, resulting in that each central office processing device can only be connected to the OLT through an independent PON access port 15, which reduces bearing efficiency of the PON access port in one aspect, and limits networking manners of a long-reach passive optical network in another aspect.

SUMMARY OF THE INVENTION

Embodiments of the present invention provide a method and a device for sending data in a passive optical network.

A method for sending data in a passive optical network includes receiving, by a central office processing device, a downstream data frame from an optical line terminal, where the downstream data frame carries a downstream frame synchronization sign, a downstream superframe number, and bandwidth map (BWMAP) information, performing downstream frame synchronization and downstream superframe synchronization by using the downstream frame synchronization sign and the downstream superframe number, sending the received downstream data frame to a terminal processing device, recording the downstream superframe number of the received downstream data frame, caching the BWMAP information in the downstream data frame, and starting timing upon receipt of the downstream frame synchronization sign of the downstream data frame, receiving an upstream channel-associated data frame sent by the terminal processing device, where the upstream channel-associated data frame includes an upstream superframe number and an upstream frame synchronization sign, and the upstream superframe number is the same as the downstream superframe number carried in the downstream data frame received from the central office processing device before the terminal processing device sends the upstream channel-associated data frame, performing upstream frame synchronization and upstream superframe synchronization by using the upstream frame synchronization sign and the upstream superframe number, stopping timing when receiving the upstream frame synchronization sign of the upstream channel-associated data frame, obtaining a loop delay between the central office processing device and the terminal processing device according to the recorded downstream superframe number of the downstream data frame, the upstream superframe number of the upstream channel-associated data frame, and a duration from the starting timing to the stopping timing, obtaining an equalization delay assigned by the optical line terminal to the terminal processing device, and determining a start time point and an end time point according to the loop delay, the equalization delay, and the BWMAP information, and between the start time point and the end time point, sending an upstream service data frame received between the start time point and the end time point to the optical line terminal.

A method for sending data in a passive optical network includes receiving, by a terminal processing device, a downstream data frame from a central office processing device, where the downstream data frame carries a downstream frame synchronization sign, a downstream superframe number, and bandwidth map (BWMAP) information, performing frame synchronization and superframe synchronization by using the downstream frame synchronization sign and the downstream superframe number, sending an upstream channel-associated data frame to the central office processing device, where the upstream channel-associated data frame includes an upstream superframe number and an upstream frame synchronization sign, and the upstream superframe number is the same as the downstream superframe number carried in the downstream data frame received from the central office processing device before the terminal processing device sends the upstream channel-associated data frame, obtaining an equalization delay assigned by an optical line terminal thereto from the received downstream data frame, and determining a start time point and an end time point according to the equalization delay and the BWMAP information in the received downstream data frame, and between the start time point and the end time point, sending an upstream service data frame received between the start time point and the end time point to the central office processing device.

A central office processing device includes a downstream receiving unit, configured to receive a downstream data frame from an optical line terminal, where the downstream data frame carries a downstream frame synchronization sign, a downstream superframe number, and BWMAP information, a downstream synchronizing unit, configured to perform frame synchronization and superframe synchronization by using the downstream frame synchronization sign and the downstream superframe number included in the downstream data frame received by the downstream receiving unit, a downstream sending unit, configured to send the downstream data frame received by the downstream receiving unit to a terminal processing device, a recording and timing unit, configured to record the downstream superframe number of the downstream data frame received by the downstream receiving unit, and start timing upon receipt of the downstream frame synchronization sign of the downstream data frame, a caching unit, configured to cache the BWMAP information of the received downstream data frame, an upstream receiving unit, configured to receive an upstream channel-associated data frame sent by the terminal processing device, where the upstream channel-associated data frame includes an upstream superframe number and an upstream frame synchronization sign, and the upstream superframe number is the same as the downstream superframe number carried in the downstream data frame received from the central office processing device before the terminal processing device sends the upstream channel-associated data frame, and configured to receive an upstream service data frame, an upstream synchronizing unit, configured to perform upstream frame synchronization and upstream superframe synchronization by using the upstream frame synchronization sign and the upstream superframe number included in the upstream data frame received by the upstream receiving unit, where the recording and timing unit is further configured to stop timing when the upstream receiving unit receives the upstream frame synchronization sign of the upstream channel-associated data frame, an obtaining unit, configured to obtain, according to the downstream superframe number of the downstream data frame recorded by the recording and timing unit, the upstream superframe number of the upstream channel-associated data frame received by the upstream receiving unit, and a duration from the starting timing to the stopping timing by the recording and timing unit, a loop delay between the central office processing device and the terminal processing device, and configured to obtain an equalization delay assigned by the optical line terminal to the terminal processing device, and an upstream sending unit, configured to determine a start time point and an end time point according to the loop delay and the equalization delay obtained by the obtaining unit, and the BWMAP information cached by the caching unit, and between the start time point and the end time point, send an upstream service data frame received by the upstream receiving unit between the start time point and the end time point to the optical line terminal.

A terminal processing device includes a receiving unit, configured to receive a downstream data frame from a central office processing device, where the downstream data frame carries a downstream frame synchronization sign, a downstream superframe number, and BWMAP information, a synchronizing unit, configured to perform frame synchronization and superframe synchronization by using the downstream frame synchronization sign and the downstream superframe number included in the downstream data frame received by the receiving unit, a sending unit, configured to send an upstream channel-associated data frame to the central office processing device, where the upstream data frame includes an upstream superframe number and an upstream frame synchronization sign, and the upstream superframe number is the same as the downstream superframe number carried in the downstream data frame received from the central office processing device before the terminal processing device sends the upstream channel-associated data frame, and an obtaining unit, configured to obtain an equalization delay assigned by an optical line terminal thereto from the downstream data frame received by the receiving unit, where the sending unit is further configured to determine a start time point and an end time point according to the equalization delay obtained by the obtaining unit and the BWMAP information in the downstream data frame received by the receiving unit, and between the start time point and the end time point, send an upstream service data frame received between the start time point and the end time point to the central office processing device.

Based on the technical solutions, the embodiments of the present invention have the following advantages.

In the embodiments of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

BRIEF DESCRIPTION OF THE DRAWINGS

For a more complete understanding of the present invention, and the advantages thereof, reference is now made to the following descriptions taken in conjunction with the accompanying drawings, in which:

FIG. 1-*a* is a schematic diagram of a network architecture of a conventional PON system;

FIG. 1-*b* is a schematic diagram of a network architecture of an existing LR-GPON system;

FIG. 1-*c* is a schematic diagram of a method for sending data in a passive optical network according to an embodiment of the present invention;

FIG. 1-*d* is a schematic diagram of a networking architecture of a passive optical network according to an embodiment of the present invention;

DETAILED DESCRIPTION OF ILLUSTRATIVE EMBODIMENTS

Figure 2:
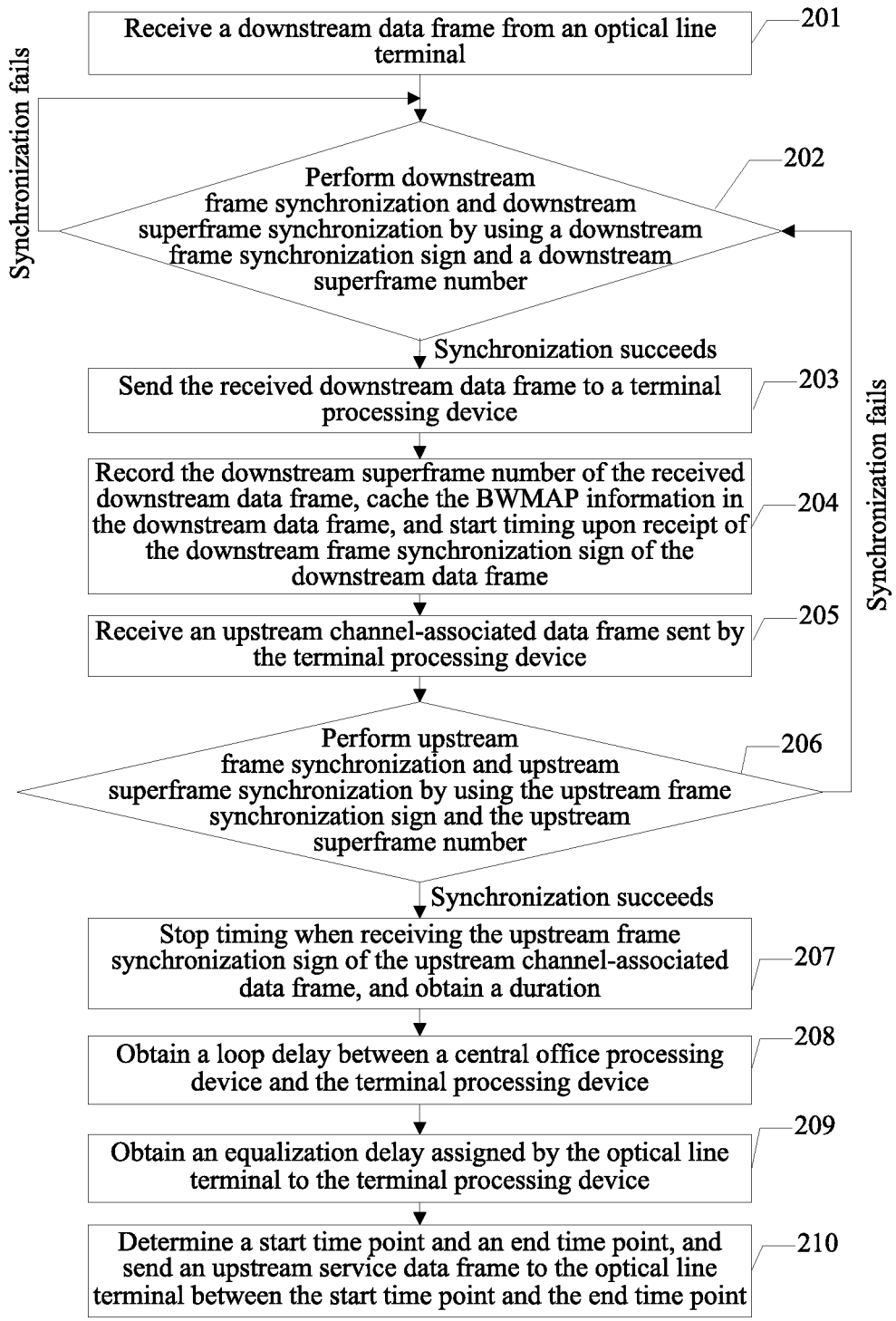
FIG. 2 is a schematic diagram of a method for sending data in a passive optical network according to another embodiment of the present invention.

Embodiments of the present invention provide a method and a device for sending data in a passive optical network.

A method for sending data in a passive optical network according to an embodiment of the present invention is described in the following by using a central office processing device as a description subject. Referring to FIG. 1-*c*, the method includes the following steps.

101. A central office processing device receives a downstream data frame from an optical line terminal.

In a passive optical network system, a data frame period for a downstream data stream is 125 microseconds. That is, an optical line terminal OLT sends a downstream data frame to a central office processing device every 125 microseconds. A structure of the downstream data frame includes a physical control block downstream (PCBd) and a payload. The central office processing device, a terminal processing device, and an ONU may obtain information such as a frame synchronization sign from the PCBd of the downstream data frame. As defined by the G.984.3 standard, fields in a PCBd module may be shown in Table 1.

TABLE 1

| Psync | Ident | PLOAMd | BIP | Plend | Plend | US BW MAP |
|---|---|---|---|---|---|---|

In Table 1, the Psync field is a physical layer synchronization field, and may be used to bear a downstream frame synchronization instruction sign; the Ident field is used to bear a superframe number, where the superframe number borne by the Ident field is a frame cycle counter having a width of 30 bits, and a superframe number 0 indicates a start of a superframe; the PLOAMd field, namely, a physical layer operations, administration and maintenance overhead field, is used to bear downstream PLOAM information; the BIP field is an 8-bit bit interleaved parity code, and is used for error detection; the Plend field is used to indicate a length of a US BW MAP field and the number of ATM cells borne in a payload; and the US BW MAP field is used to bear bandwidth map (BWMAP) information of a user, which mainly includes fields shown in Table 2.

TABLE 2

| Allocation ID | Start | Stop |
|---|---|---|

The Allocation ID field is used to bear an identity (ID) of a network element device (such as an ONU) that is authorized for sending; the Start field is used to bear a location of a sending-start timeslot; and the Stop field is used to bear a location of a sending-end timeslot. In an actual application, one Allocation ID corresponds to a unique Start and Stop. A US BW MAP field normally includes multiple different Allocation IDs. A network element device obtains a sending-start timeslot and a sending-end timeslot assigned by an OLT thereto by identifying an Allocation ID in the US BW MAP field.

102. Perform downstream frame synchronization and downstream superframe synchronization by using the downstream frame synchronization sign and the downstream superframe number.

The central office processing device, after receiving the downstream data frame from the OLT, may perform local downstream frame synchronization and downstream superframe synchronization by using the downstream frame synchronization sign and the downstream superframe number in the downstream data frame.

In an actual application, the central office processing device maintains two local 30-bit cycle counters, where one is used for downstream superframe synchronization and the other is used for upstream superframe synchronization. The central office processing device, after receiving the downstream data frame from the OLT, completes local downstream frame synchronization by locating the downstream frame synchronization sign in the PCBd field of the downstream data frame; and uses a superframe number borne by the Ident field of the downstream data frame as an initial value of the cycle counter, where the cycle counter is added by 1 each time a downstream data frame is located later to ensure that a value of the cycle counter is consistent with the superframe number borne by an Ident field of each received downstream data frame, thereby completing downstream superframe synchronization.

103. Send the received downstream data frame to a terminal processing device.

The central office processing device may deliver the received downstream data frame to the terminal processing device after completing the local frame synchronization and superframe synchronization. Indeed, the central office processing device may also deliver the received downstream data frame to the terminal processing device after step 101 without waiting for the central office processing device to complete the local frame synchronization and superframe synchronization successfully, where no limitation is set herein.

104. Record the downstream superframe number of the received downstream data frame, cache the BWMAP information in the downstream data frame, and start timing upon receipt of the downstream frame synchronization sign of the downstream data frame.

As calculated by using a sending period of a downstream data frame which is 125 microseconds, a frame cycle counter having a width of 30 bits is capable of differentiating ($2^{30} \times 125 \times 10^{-6}$) seconds, that is, differentiating 134217.728 seconds. Loop delays generated over a transmission distance of 100 kilometers are merely to the extent of milliseconds. Therefore, in the embodiment of the present invention, a superframe number may be used to calculate a loop delay between a central office processing device and a terminal processing device.

Because a sending period of a downstream data frame is 125 microseconds, the central office processing device receives a downstream data frame from the OLT every 125 microseconds. The central office processing device may record the downstream superframe number of the downstream data frame currently sent to the terminal processing device; start timing upon receipt of the downstream frame synchronization sign of the downstream data frame; and cache the BWMAP information in the downstream data frame; or the central office processing device may also, after sending the received downstream data frame to the terminal processing device, record a downstream superframe number of any downstream data frame received from the OLT later; start timing upon receipt of the downstream frame synchronization sign of the downstream data frame; and cache the BWMAP information in the downstream data frame.

105. Receive an upstream channel-associated data frame sent by the terminal processing device.

The central office processing device receives the upstream channel-associated data frame sent by the terminal processing device, where the upstream channel-associated data frame is sent by the terminal processing device after receiving the downstream data frame from the central office processing device. The upstream channel-associated data frame includes an upstream superframe number and an upstream frame synchronization sign, where the upstream superframe number is the same as the downstream superframe number carried in the downstream data frame received from the central office processing device before the terminal processing device sends the upstream channel-associated data frame, that is, the same as the downstream superframe number carried in the downstream data frame received before sending, thereby ensuring that the central office processing device may accurately subtract a loop delay between the central office processing device and the terminal processing device. The upstream channel-associated data frame carries the upstream frame synchronization sign, and the central office processing device may identify and locate the upstream channel-associated data frame by using the upstream frame synchronization sign. Assuming that a terminal processing device receives a downstream frame synchronization sign of a downstream data frame at time t1 before sending, the upstream frame synchronization sign may be inserted into the upstream channel-associated data frame at time t1 or at time after delaying a preset system time from t1; and the upstream frame synchronization sign may be the same as the downstream frame synchronization sign or be different from the downstream frame synchronization sign. The upstream frame synchronization sign may be set according to actual requirements and no limitation is set herein.

In an actual application, the central office processing device and the terminal processing device may establish, by using an upstream redundancy bandwidth, an associated channel for transmitting an upstream channel-associated data frame. For example, in a gigabit passive optical network, because a mainstream service of the gigabit passive optical network is an asymmetrical service, a downstream rate is 2.488 Gbps, and an upstream rate is 1.244 Gbps. However, according to the G.709 standard, upstream and downstream channels both occupy a bandwidth of 2.488 Gbps. There is an upstream redundant bandwidth of 1.244 Gbps. Therefore, the central office processing device and the terminal processing device may sufficiently use the bandwidth resource, and establish an associated channel by using the 1.244 Gbps upstream redundant bandwidth.

106. Perform upstream frame synchronization and upstream superframe synchronization by using the upstream frame synchronization sign and the upstream superframe number.

The central office processing device, after receiving the upstream channel-associated data frame from the terminal processing device, may perform local upstream frame synchronization and upstream superframe synchronization by using the upstream frame synchronization sign and the upstream superframe number in the upstream channel-associated data frame.

In an actual application, the central office processing device maintains two local 30-bit cycle counters, where one is used for downstream superframe synchronization and the other is used for upstream superframe synchronization. The central office processing device, after receiving the upstream channel-associated data frame from the terminal processing device, completes local upstream frame synchronization by locating the upstream frame synchronization sign in the upstream channel-associated data frame; and uses a superframe number of the upstream channel-associated data frame as an initial value of the cycle counter, where the cycle counter is added by 1 each time an upstream channel-associated data frame is located later to ensure that a value of the cycle counter is consistent with the superframe number of each received upstream channel-associated data frame, thereby completing upstream superframe synchronization.

107. Stop timing when receiving the upstream frame synchronization sign of the upstream channel-associated data frame, and obtain a duration.

The central office processing device stops timing when receiving the upstream frame synchronization sign of the upstream channel-associated data frame from the terminal processing device, and obtains a duration from the time when the timing is started in step 104 to the current time when the timing is stopped.

108. Obtain a loop delay between the central office processing device and the terminal processing device.

The central office processing device may obtain the loop delay between the central office processing device and the terminal processing device according to the downstream superframe number of the downstream data frame recorded in step 104, the upstream superframe number of the upstream channel-associated data frame received in step 105, and the duration obtained in step 107.

Specifically, under the circumstances that the frame synchronization and the superframe synchronization are synchronized, if the upstream superframe number of the upstream channel-associated data frame in step 107 is the same as the downstream superframe number of the downstream data frame recorded in step 104, the central office processing device may use the duration obtained in step 107 as the loop delay between the central office processing device and the terminal processing device. If the upstream superframe number of the upstream channel-associated data frame in step 107 is greater or smaller than the downstream superframe number of the downstream data frame recorded in step 104, a superframe overhead difference may be obtained first; the superframe overhead difference is multiplied by 125 microseconds; and then the duration obtained in step 107 is added, to obtain the loop delay between the central office processing device and the terminal processing device. The superframe overhead difference is obtained in two cases: when the downstream superframe number is greater than the upstream superframe number, the superframe overhead difference may be obtained by subtracting the upstream superframe number of the upstream channel-associated data frame from the recorded downstream superframe number of the downstream data frame; and when the downstream superframe number is smaller than the upstream superframe number, the superframe overhead difference is obtained by subtracting the upstream superframe number from the downstream superframe number, and then adding 2 to the 30th power.

109. Obtain an equalization delay assigned by the optical line terminal to the terminal processing device.

In an actual application, the OLT normally bears the equalization delay assigned to the terminal processing device and/or the ONU in the PLOAMd field of the downstream data frame. The central office processing device may monitor the PLOAMd field in the received downstream data frame to obtain the equalization delay of the terminal processing device. Indeed, the terminal processing device may also actively send the equalization delay assigned thereto by the OLT to the central office processing device, and no limitation is set herein.

It should be noted that in a passive optical network networking, it cannot be ensured that actual distances from ONUs to the OLT are the same; therefore, to ensure that upstream data frames sent by ONUs located at different distances overlap completely when transferred to the OLT, the OLT obtains an equalization delay for each ONU by measuring a distance from each ONU to a networking reference point (that is, a farthest ONU that is assumed to exist in a distance measurement window scope), and assigns the equalization delay to each ONU. The ONU uses the equalization delay assigned by the OLT to match sending-start time (start) and sending-end time (stop) in local BWMAP information, to control the burst sending of the upstream data frame. In an actual application, a window scope that the OLT is capable of measuring is normally not more than 20 km. That is, the OLT is only capable of assigning an equalization delay to a network element device within 20 km. The terminal processing device is normally provided within the window scope that the OLT is capable of measuring. Based on the "window ranging technology" provided by the G.984 standard, the terminal processing device responds to distance measuring of the OLT by simulating an ONU, to obtain the equalization delay assigned to the terminal processing device by the OLT.

110. Determine a start time point and an end time point, and send an upstream service data frame to the optical line terminal between the start time point and the end time point.

The central office processing device, after obtaining the equalization delay of the terminal processing device, may determine the start time point and the end time point by using the obtained equalization delay of the terminal processing device and the locally cached BWMAP information. For example, assuming that a loop delay is T1, an equalization delay is T2, and sending-start time and sending-stop time assigned to an ONU 1 in the locally cached BWMAP information are respectively a1 and a2, it may be determined that a start time point and an end time point corresponding to the ONU 1 relative to time of a downstream frame synchronization sign of a downstream data frame carrying the BWMAP information are respectively (a1+T1+T2) and (a2+T1+T2); the central office processing device may receive an upstream service data frame from the ONU 1 between the start time point and the end time point, and send the upstream service data frame received from the ONU 1 to the OLT.

It should be noted that in an actual application, if a synchronization failure occurs in step 102 or step 106, that is, any one of the upstream frame, upstream superframe, downstream frame, or downstream superframe synchronizations fails, the central office processing device stops sending any data, clears all cached BWMAP information, and repeats the execution of step 102.

It may be understood that if the downstream frame and downstream superframe synchronization of the central office processing device succeeds, but the downstream and downstream superframe synchronization of the terminal processing device fails due to a transmission fault, the terminal processing device will not send an upstream channel-associated data frame to the central office processing device. Therefore, in an actual application, a duration may be preset, and when the duration starting from the timing by the central office processing device in step 104 exceeds the preset duration, the timing is stopped for starting timing again.

Based on the technical solution according to the embodiment of the present invention, the present invention further provides a new networking solution. As shown in FIG. 1-*d*, multiple office processing devices 22 access an optical line terminal 20 by using an optical splitter 21; each central office processing device 22 transmits data to a terminal processing device 23 over a long distance through an OTN network and WDM technologies; and multiple optical network units 25 access the terminal processing device through an optical distribution network 24. This networking solution realizes that multiple office processing devices may access the same PON access port, thereby greatly improving bearing efficiency of the PON access port.

According to the above description, in the embodiment of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

In order to illustrate the technical solution according to the present invention more clearly, the technical solution according to the present invention is further described in the following. Referring to FIG. 2, in the embodiments of the present invention, a method for sending data in a passive optical network according to another embodiment includes the follows steps.

201. A central office processing device receives a downstream data frame from an optical line terminal.

Reference may be made to the description of step 101 in FIG. 1-*c* for the specific description of this step, which will not be described repeatedly herein.

202. Perform downstream frame synchronization and downstream superframe synchronization by using the downstream frame synchronization sign and the downstream superframe number.

The central office processing device, after receiving the downstream data frame from the OLT, may perform local downstream frame synchronization and downstream superframe synchronization by using the downstream frame synchronization sign and the downstream superframe number in the downstream data frame.

In an actual application, the central office processing device maintains two local 30-bit cycle counters, where one is used for downstream superframe synchronization and the other is used for upstream superframe synchronization. The central office processing device, after receiving the downstream data frame from the OLT, completes local downstream frame synchronization by locating the downstream frame synchronization sign in the PCBd field of the downstream data frame; and uses a superframe number borne by the Ident field of the downstream data frame as an initial value of the cycle counter, where the cycle counter is added by 1 each time a downstream data frame is located later to ensure that a value of the cycle counter is consistent with the superframe number borne by an Ident field of each received downstream data frame, thereby completing downstream superframe synchronization.

When the central office processing device fails to complete the downstream frame synchronization or the downstream superframe synchronization, that is, the downstream frame synchronization fails or the downstream superframe synchronization fails, the central office processing device stops sending any data and repeats the execution of step 202 until the downstream frame synchronization and the downstream superframe synchronization are completed. The central office processing device executes step 203 when completing the downstream frame synchronization and the downstream superframe synchronization.

203. Send the received downstream data frame to a terminal processing device.

The central office processing device may deliver the received downstream data frame to the terminal processing device after completing the frame synchronization and the superframe synchronization.

204. Record the downstream superframe number of the received downstream data frame, cache the BWMAP information in the downstream data frame, and start timing upon receipt of the downstream frame synchronization sign of the downstream data frame.

205. Receive an upstream channel-associated data frame sent by the terminal processing device.

The central office processing device receives the upstream channel-associated data frame sent by the terminal processing device, where the upstream channel-associated data frame is sent by the terminal processing device after receiving the downstream data frame from the central office processing device. The upstream channel-associated data frame includes an upstream superframe number and an upstream frame synchronization sign, where the upstream superframe number is the same as the downstream superframe number carried in the downstream data frame received from the central office processing device before the terminal processing device sends the upstream channel-associated data frame, that is, the same as the downstream superframe number carried in the downstream data frame received before sending, thereby ensuring that the central office processing device may accurately subtract a loop delay between the central office processing device and the terminal processing device. The upstream channel-associated data frame carries the upstream frame synchronization sign, and the central office processing device may identify and locate the upstream channel-associated data frame by using the upstream frame synchronization sign.

Assuming that a terminal processing device receives a downstream frame synchronization sign of a downstream data frame at time t1 before sending, the upstream frame synchronization sign may be inserted into the upstream channel-associated data frame at time t1 or at time after delaying a preset system time from t1; and the upstream frame synchronization sign may be the same as the downstream frame synchronization sign or be different from the downstream frame synchronization sign. The upstream frame synchronization sign may be set according to actual requirements and no limitation is set herein.

In an actual application, the central office processing device and the terminal processing device may establish an associated channel by using an upstream redundancy bandwidth for transmitting an upstream channel-associated data frame. For example, in a gigabit passive optical network, because a mainstream service of the gigabit passive optical network is an asymmetrical service, a downstream rate is 2.488 Gbps, and an upstream rate is 1.244 Gbps. However, according to the G.709 standard, upstream and downstream channels both occupy a bandwidth of 2.488 Gbps. There is an upstream redundant bandwidth of 1.244 Gbps. Therefore, the central office processing device and the terminal processing device may sufficiently use the bandwidth resource, and establish an associated channel by using the 1.244 Gbps upstream redundant bandwidth.

206. Perform upstream frame synchronization and upstream superframe synchronization by using the upstream frame synchronization sign and the upstream superframe number.

The central office processing device, after receiving the upstream channel-associated data frame from the terminal processing device, may perform local upstream frame synchronization and upstream superframe synchronization by using the upstream frame synchronization sign and the upstream superframe number in the upstream channel-associated data frame.

In an actual application, the central office processing device maintains two local 30-bit cycle counters, where one is used for downstream superframe synchronization and the other is used for upstream superframe synchronization. The central office processing device, after receiving the upstream channel-associated data frame from the terminal processing device, completes local upstream frame synchronization by locating the upstream frame synchronization sign in the upstream channel-associated data frame; and uses a superframe number of the upstream channel-associated data frame as an initial value of the cycle counter, where the cycle counter is added by 1 each time an upstream channel-associated data frame is located later to ensure that a value of the cycle counter is consistent with the superframe number of each received upstream channel-associated data frame, thereby completing upstream superframe synchronization.

When the central office processing device fails to complete the upstream frame synchronization or the upstream superframe synchronization, that is, the upstream frame synchronization fails or the upstream superframe synchronization fails, the central office processing device stops sending any data, clears all cached BWMAP information, and repeats the execution of step 202. The central office processing device executes step 207 when completing the upstream frame synchronization and the upstream superframe synchronization.

207. Stop timing when receiving the upstream frame synchronization sign of the upstream channel-associated data frame, and obtain a duration.

The superframe number in the upstream channel-associated data frame is the same as the downstream superframe number of the downstream data frame recorded in step 204.

In an actual application, the central office processing device may, when receiving the upstream channel-associated data frame from the terminal processing device, detect whether the upstream channel-associated data is the same as the downstream superframe number of the downstream data frame recorded in step 204, and if yes, stop timing when receiving the upstream frame synchronization sign of the upstream channel-associated data frame, and obtain a duration from the timing started in step 204 to the timing currently stopped.

208. Obtain a loop delay between the central office processing device and the terminal processing device.

The duration obtained in step 207 is used as the loop delay between the central office processing device and the terminal processing device.

209. Obtain an equalization delay assigned by the optical line terminal to the terminal processing device.

In an actual application, the OLT normally bears the equalization delay assigned to the terminal processing device and/or the ONU in the PLOAMd field of the downstream data frame. The central office processing device may monitor the PLOAMd field in the received downstream data frame to obtain the equalization delay of the terminal processing device. Indeed, the terminal processing device may also actively send the equalization delay assigned thereto by the OLT to the central office processing device, and no limitation is set herein.

It should be noted that in a passive optical network networking, actual distances from ONUs to the OLT are not necessarily the same; therefore, to ensure that upstream data frames sent by ONUs located at different distances overlap completely when transferred to the OLT, the OLT obtains an equalization delay for each ONU by measuring a distance from each ONU to a networking reference point (that is, a farthest ONU that is assumed to exist in a distance measurement window scope), and assigns the equalization delay to each ONU. The ONU uses the equalization delay assigned by the OLT to match sending-start time (start) and sending-end time (stop) in local BWMAP information, to control the burst sending of the upstream data frame. In an actual application, a window scope that the OLT is capable of measuring is normally not more than 20 km. That is, the OLT is only capable of assigning an equalization delay to a network element device within 20 km. The terminal processing device is normally provided within the window scope that the OLT is capable of measuring. Based on the "window ranging principle" provided by the G.984 standard, the terminal processing device responds to distance measuring of the OLT by simulating an ONU, to obtain the equalization delay assigned to the terminal processing device by the OLT.

210. Determine a start time point and an end time point, and send an upstream service data frame to the optical line terminal between the start time point and the end time point.

The central office processing device, after obtaining the equalization delay of the terminal processing device, may determine the start time point and the end time point by using the obtained equalization delay of the terminal processing device and the locally cached BWMAP information. For example, assuming that a loop delay is T1, an equalization delay is T2, and sending-start time and sending-stop time assigned to an ONU 1 in the locally cached BWMAP information are respectively a1 and a2, it may be determined that a start time point and an end time point corresponding to the ONU 1 relative to time of a downstream frame synchronization sign of a downstream data frame carrying the BWMAP information are respectively (a1+T1+T2) and (a2+T1+T2); the central office processing device may receive an upstream service data frame from the ONU 1 between the start time point and the end time point, and send the upstream service data frame received from the ONU 1 to the OLT.

It may be understood that if the downstream frame and downstream superframe synchronization of the central office processing device succeeds, but the downstream and downstream superframe synchronization of the terminal processing device fails due to a transmission fault, the terminal processing device will not send an upstream channel-associated data frame to the central office processing device. Therefore, in an actual application, a duration may be preset, and when the duration starting from the timing by the central office processing device in step 204 exceeds the preset duration, the timing is stopped for starting timing again.

According to the above description, in the embodiment of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

Figure 3:
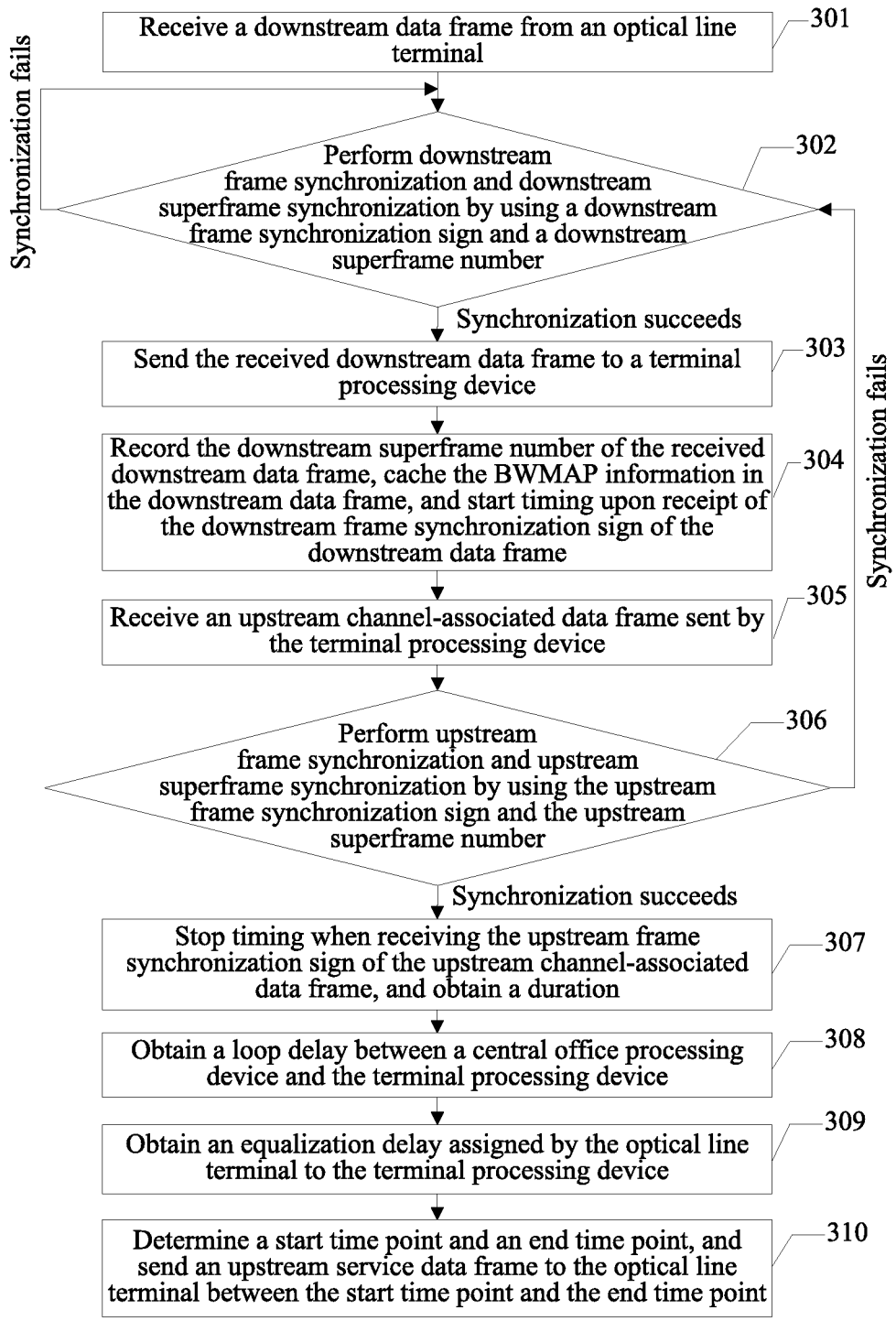
FIG. 3 is a schematic diagram of a method for sending data in a passive optical network according to still another embodiment of the present invention.

Referring to FIG. 3, in the embodiments of the present invention, a method for sending data in a passive optical network according to another embodiment includes the following steps.

301. A central office processing device receives a downstream data frame from an optical line terminal.

Reference may be made to the description of step 101 in FIG. 1-*c* for the specific description of this step, which will not be described repeatedly herein.

302. Perform downstream frame synchronization and downstream superframe synchronization by using the downstream frame synchronization sign and the downstream superframe number.

The central office processing device, after receiving the downstream data frame from the OLT, may perform local downstream frame synchronization and downstream superframe synchronization by using the downstream frame synchronization sign and the downstream superframe number in the downstream data frame.

In an actual application, the central office processing device maintains two local 30-bit cycle counters, where one is used for downstream superframe synchronization and the other is used for upstream superframe synchronization. The central office processing device, after receiving the downstream data frame from the OLT, completes local downstream frame synchronization by locating the downstream frame synchronization sign in the PCBd field of the downstream data frame; and uses a superframe number borne by the Ident field of the downstream data frame as an initial value of the cycle counter, where the cycle counter is added by 1 each time a downstream data frame is located later to ensure that a value of the cycle counter is consistent with the superframe number borne by an Ident field of each received downstream data frame, thereby completing downstream superframe synchronization.

When the central office processing device fails to complete the downstream frame synchronization or the downstream superframe synchronization, that is, the downstream frame synchronization fails or the downstream superframe synchronization fails, the central office processing device stops sending any data and repeats the execution of step 302 until the downstream frame synchronization and the downstream superframe synchronization are completed. The central office processing device executes step 303 when completing the downstream frame synchronization and the downstream superframe synchronization.

303. Send the received downstream data frame to a terminal processing device.

The central office processing device may deliver the received downstream data frame to the terminal processing device after completing the local frame synchronization and superframe synchronization.

304. Record the downstream superframe number of the received downstream data frame, cache the BWMAP information in the downstream data frame, and start timing upon receipt of the downstream frame synchronization sign of the downstream data frame.

305. Receive an upstream channel-associated data frame sent by the terminal processing device.

The central office processing device receives the upstream channel-associated data frame sent by the terminal processing device, where the upstream channel-associated data frame is sent by the terminal processing device after receiving the downstream data frame from the central office processing device. The upstream channel-associated data frame includes an upstream superframe number and an upstream frame synchronization sign, where the upstream superframe number is the same as the downstream superframe number carried in the downstream data frame received from the central office processing device before the terminal processing device sends the upstream channel-associated data frame, that is, the same as the downstream superframe number carried in the downstream data frame received before sending, thereby ensuring that the central office processing device may accurately subtract a loop delay between the central office processing device and the terminal processing device. The upstream channel-associated data frame carries the upstream frame synchronization sign, and the central office processing device may identify and locate the upstream channel-associated data frame by using the upstream frame synchronization sign. Assuming that a terminal processing device receives a downstream frame synchronization sign of a downstream data frame at time t1 before sending, the upstream frame synchronization sign may be inserted into the upstream channel-associated data frame at time t1 or at time after delaying a preset system time from t1; and the upstream frame synchronization sign may be the same as the downstream frame synchronization sign or be different from the downstream frame synchronization sign. The upstream frame synchronization sign may be set according to actual requirements and no limitation is set herein.

In an actual application, the central office processing device and the terminal processing device may establish an associated channel by using an upstream redundancy bandwidth for transmitting an upstream channel-associated data frame. For example, in a gigabit passive optical network, because a mainstream service of the gigabit passive optical network is an asymmetrical service, a downstream rate is 2.488 Gbps, and an upstream rate is 1.244 Gbps. However, according to the G.709 standard, upstream and downstream channels both occupy a bandwidth of 2.488 Gbps. There is an upstream redundant bandwidth of 1.244 Gbps. Therefore, the central office processing device and the terminal processing device may sufficiently use the bandwidth resource, and establish an associated channel by using the 1.244 Gbps upstream redundant bandwidth.

306. Perform upstream frame synchronization and upstream superframe synchronization by using the upstream frame synchronization sign and the upstream superframe number.

The central office processing device, after receiving the upstream channel-associated data frame from the terminal processing device, may perform local upstream frame synchronization and upstream superframe synchronization by using the upstream frame synchronization sign and the upstream superframe number in the upstream channel-associated data frame.

In an actual application, the central office processing device maintains two local 30-bit cycle counters, where one is used for downstream superframe synchronization and the other is used for upstream superframe synchronization. The central office processing device, after receiving the upstream channel-associated data frame from the terminal processing device, completes local upstream frame synchronization by locating the upstream frame synchronization sign in the upstream channel-associated data frame; and uses a superframe number of the upstream channel-associated data frame as an initial value of the cycle counter, where the cycle counter is added by 1 each time an upstream channel-associated data frame is located later to ensure that a value of the cycle counter is consistent with the superframe number of each received upstream channel-associated data frame, thereby completing upstream superframe synchronization.

When the central office processing device fails to complete the upstream frame synchronization or the upstream superframe synchronization, that is, the upstream frame synchronization fails or the upstream superframe synchronization fails, the central office processing device stops sending any data, clears all cached BWMAP information, and repeats the execution of step 302. The central office processing device executes step 307 when completing the upstream frame synchronization and the upstream superframe synchronization.

307. Stop timing when receiving the upstream frame synchronization sign of the upstream channel-associated data frame, and obtain a duration.

The central office processing device stops timing when receiving the upstream frame synchronization sign of the upstream channel-associated data frame from the terminal processing device, and obtains a duration from the timing started in step 304 to the current time when the timing is stopped.

308. Obtain a loop delay between the central office processing device and the terminal processing device.

In the embodiment of the present invention, the central office processing device, after completing step 303, that is, after sending the received downstream data frame to the terminal processing device, records a downstream superframe number of any downstream data frame received from the OLT later. As a result, the downstream superframe number of the downstream data frame recorded by the central office processing device may be greater or smaller than the upstream superframe number of the upstream channel-associated data frame in step 307. The central office processing device may obtain a superframe overhead difference through calculation first, multiply the obtained superframe overhead difference by 125 microseconds, and then add the duration obtained in step 307, to obtain the loop delay between the central office processing device and the terminal processing device.

Specifically, the superframe overhead difference is obtained in two cases: when the downstream superframe number is greater than the upstream superframe number, the superframe overhead difference may be obtained by subtracting the upstream superframe number of the upstream channel-associated data frame from the recorded downstream superframe number of the downstream data frame; and when the downstream superframe number is smaller than the upstream superframe number, the superframe overhead difference is obtained by subtracting the upstream superframe number from the downstream superframe number, and then adding 2 to the 30th power.

309. Obtain an equalization delay assigned by the optical line terminal to the terminal processing device.

In an actual application, the OLT normally bears the equalization delay assigned to the terminal processing device and/or the ONU in the PLOAMd field of the downstream data frame. The central office processing device may monitor the PLOAMd field in the received downstream data frame to obtain the equalization delay of the terminal processing device. Indeed, the terminal processing device may also actively send the equalization delay assigned thereto by the OLT to the central office processing device, and no limitation is set herein.

It should be noted that in a passive optical network networking, actual distances from ONUs to the OLT are not necessarily the same; therefore, to ensure that upstream data frames sent by ONUs located at different distances overlap completely when transferred to the OLT, the OLT obtains an equalization delay for each ONU by measuring a distance from each ONU to a networking reference point (that is, a farthest ONU that is assumed to exist in a distance measurement window scope), and assigns the equalization delay to each ONU. The ONU uses the equalization delay assigned by the OLT to match sending-start time (start) and sending-end time (stop) in local BWMAP information, to control the burst sending of the upstream data frame. In an actual application, a window scope that the OLT is capable of measuring is normally not more than 20 km. That is, the OLT is only capable of assigning an equalization delay to a network element device within 20 km. The terminal processing device is normally provided within the window scope that the OLT is capable of measuring. Based on the "window ranging principle" provided by the G.984 standard, the terminal processing device responds to distance measuring of the OLT by simulating an ONU, to obtain the equalization delay assigned to the terminal processing device by the OLT.

310. Determine a start time point and an end time point, and send an upstream service data frame to the optical line terminal between the start time point and the end time point.

The central office processing device, after obtaining the equalization delay of the terminal processing device, may determine the start time point and the end time point by using the obtained equalization delay of the terminal processing device and the locally cached BWMAP information. For example, assuming that a loop delay is T1, an equalization delay is T2, and sending-start time and sending-stop time assigned to an ONU 1 in the locally cached BWMAP information are respectively a1 and a2, it may be determined that a start time point and an end time point corresponding to the ONU 1 relative to time of a downstream frame synchronization sign of a downstream data frame carrying the BWMAP information are respectively (a1+T1+T2) and (a2+T1+T2); the central office processing device may receive an upstream service data frame from the ONU 1 between the start time point and the end time point, and send the upstream service data frame received from the ONU 1 to the OLT.

It may be understood that if the downstream frame and downstream superframe synchronization of the central office processing device succeeds, but the downstream and downstream superframe synchronization of the terminal processing device fails due to a transmission fault, the terminal processing device will not send an upstream channel-associated data frame to the central office processing device. Therefore, in an actual application, a duration may be preset, and when the duration starting from the timing by the central office processing device in step 304 exceeds the preset duration, the timing is stopped for starting timing again.

According to the above description, in the embodiment of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

Figure 4:
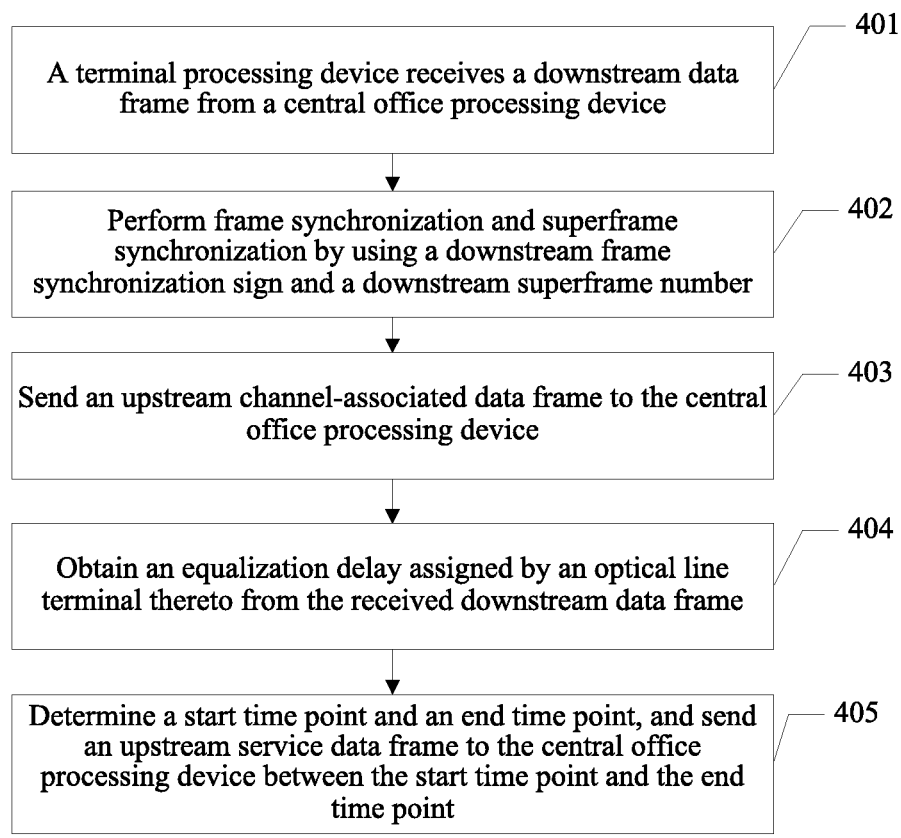
FIG. 4 is a schematic diagram of a method for sending data in a passive optical network according to still another embodiment of the present invention.

A method for sending data in a passive optical network according to an embodiment of the present invention is described in the following by using a terminal processing device as a description subject. Referring to FIG. 4, the method includes the following steps.

401. A terminal processing device receives a downstream data frame from a central office processing device.

The downstream data frame received by the terminal processing device includes a downstream frame synchronization sign, a downstream superframe number, and bandwidth map information, where a specific format of the downstream data frame may be shown in Table 1 and Table 2 in the embodiment corresponding to FIG. 1.

402. Perform frame synchronization and superframe synchronization by using the downstream frame synchronization sign and the downstream superframe number.

In an actual application, the terminal processing device maintains a local 30-bit cycle counter that is used for downstream superframe synchronization. The terminal processing device, after receiving the downstream data frame from the central office processing device, completes local downstream frame synchronization by locating the downstream frame synchronization sign in a PCBd field of the downstream data frame; and uses a superframe number borne by an Ident field of the downstream data frame as an initial value of the cycle counter, where the cycle counter is added by 1 each time a downstream data frame is located later to ensure that a value of the cycle counter is consistent with the superframe number borne by an Ident field of each received downstream data frame, thereby completing downstream superframe synchronization.

403. Send an upstream channel-associated data frame to the central office processing device.

The terminal processing device, after completing the downstream frame synchronization and the downstream superframe synchronization, sends the upstream channel-associated data frame to the central office processing device, and carries the superframe number in the downstream data frame received before in the upstream channel-associated data frame, where the upstream channel-associated data frame further includes an upstream frame synchronization sign so that the central office processing device may identify and locate the upstream channel-associated data frame by using the upstream frame synchronization sign. The terminal processing device, when receiving the downstream frame synchronization sign of the downstream data frame, insert the upstream frame synchronization sign into the upstream channel-associated data frame; or the terminal processing device may, after receiving the downstream frame synchronization sign of the downstream data frame, insert the upstream frame synchronization sign into the upstream channel-associated data frame after delaying a preset system time, where the upstream frame synchronization sign may be the same as the downstream frame synchronization sign or be different from the downstream frame synchronization sign. The upstream frame synchronization sign may be set according to actual requirements and no limitation is set herein.

In an actual application, the terminal processing device and the central office processing device may establish an associated channel by using an upstream redundancy bandwidth for transmitting an upstream channel-associated data frame. For example, in a gigabit passive optical network, because a mainstream service of the gigabit passive optical network is an asymmetrical service, a downstream rate is 2.488 Gbps, and an upstream rate is 1.244 Gbps. However, according to the G.709 standard, upstream and downstream channels both occupy a bandwidth of 2.488 Gbps. There is an upstream redundant bandwidth of 1.244 Gbps. Therefore, the central office processing device and the terminal processing device may sufficiently use the bandwidth resource, and establish an associated channel by using the 1.244 Gbps upstream redundant bandwidth.

To ensure a precise time relationship between the upstream channel-associated data frame and the upstream service data frame, the terminal processing device may combine the upstream service data frame and the upstream channel-associated data frame by bit interleaving or byte interleaving, and then map the same into the OTN network.

Further, the terminal processing device may also use this associated channel to send upstream system alarm information defined in the G.984 protocol, such as an ONU data check error indicator, and a delimitation failure.

It should be noted that in step 402, if the terminal processing device fails to complete the downstream frame synchronization or the downstream superframe synchronization, it does not send the upstream channel-associated data frame to the central office processing device.

404. Obtain an equalization delay assigned by an optical line terminal thereto from the received downstream data frame.

In an actual application, the OLT normally bears the equalization delay assigned to the terminal processing device and/ or ONU in a PLOAMd field of the downstream data frame. The terminal processing device may obtain the equalization delay assigned by the OLT thereto from the PLOAMd field in the received downstream data frame.

405. Determine a start time point and an end time point, and send an upstream service data frame to the central office processing device between the start time point and the end time point.

The terminal processing device may determine the start time point and the end time point by using the obtained local equalization delay and the BWMAP information in the received downstream data frame. For example, assuming that a local equalization delay of the terminal processing device is T3, and sending-start time and sending-stop time assigned to an ONU 1 in BWMAP information of a received downstream data frame are respectively b1 and b2, it may be determined that a start time point and an end time point corresponding to the ONU 1 relative to time of a downstream frame synchronization sign of the downstream data frame carrying the BWMAP information are respectively (b1+T3) and (b2+T3); the terminal processing device may receive an upstream service data frame from the ONU 1 between the start time point and the end time point, and send the upstream service data frame received from the ONU 1 to the central office processing device.

According to the above description, in the embodiment of the present invention, a terminal processing device, after completing frame synchronization and superframe synchronization by using a received downstream data frame, by sending an upstream channel-associated data frame to a central office processing device, enables the central office processing device to, by recording time of the received downstream data frame and a downstream superframe number of the downstream data frame, obtain a loop delay between the central office processing device and the terminal processing device by using time when the upstream channel-associated data frame is received and an upstream superframe number of the upstream channel-associated data frame, thereby enabling the central office processing device to, after subtracting the loop delay and by using cached BWMAP information and the obtained equalization delay of the terminal processing device, accurately determine a start time point and an end time point for sending an upstream service data frame to an optical line terminal, which implements accurate control for sending the upstream service data frame.

Figure 5:
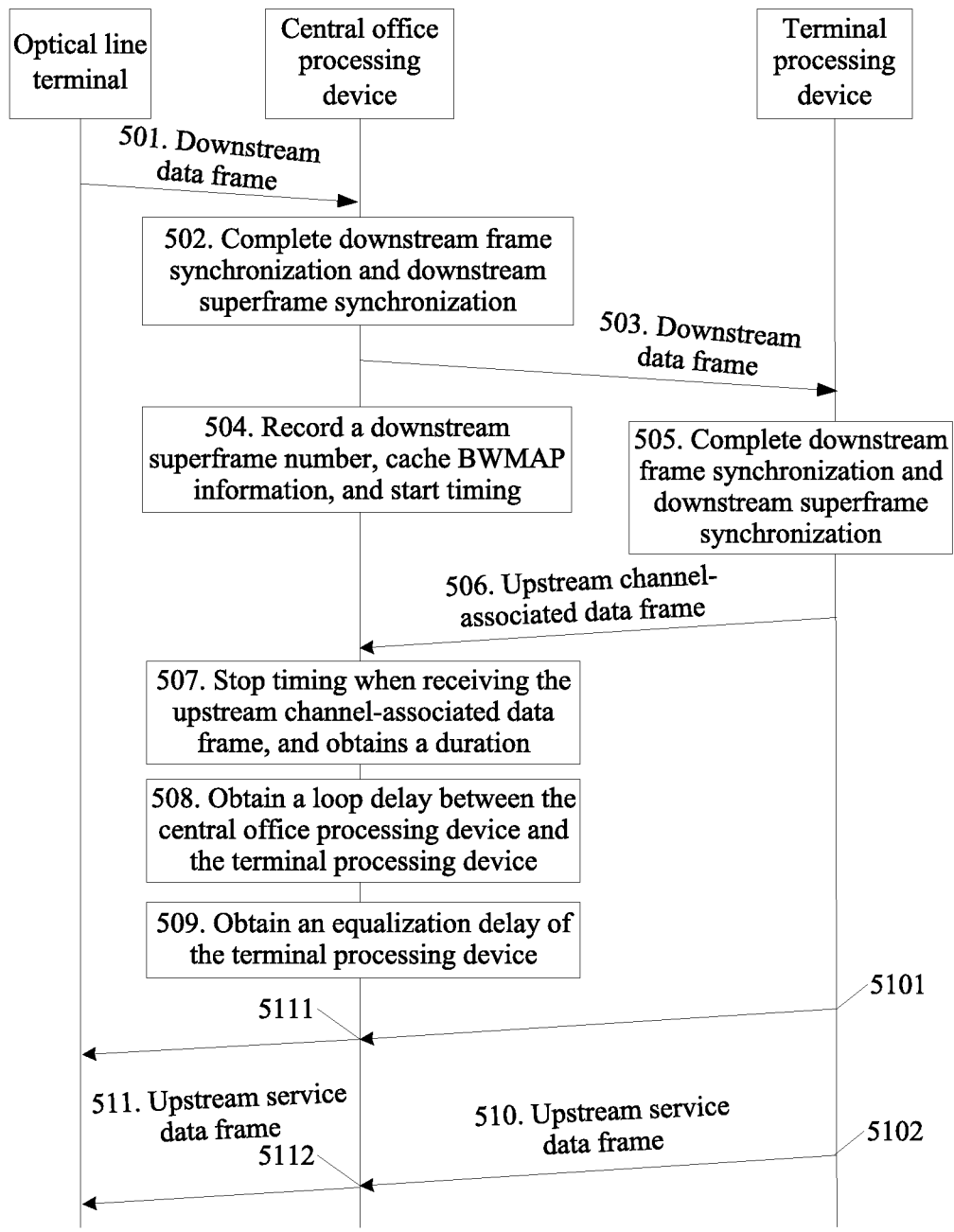
FIG. 5 is a schematic diagram of a method for sending data in a passive optical network according to still another embodiment of the present invention.

A method for sending data in a passive optical network according to an embodiment of the present invention is described in the following by using a central office processing device and a terminal processing device as description subjects. It is assumed that the central office processing device records a downstream superframe number of a downstream data frame when sending the downstream data frame to the terminal processing device. Referring to FIG. 5, in the embodiments of the present invention, a method for sending data in a passive optical network according to still another embodiment includes the follows steps.

501. A central office processing device receives a downstream data frame from an optical line terminal.

502. The central office processing device completes downstream frame synchronization and downstream superframe synchronization by using a downstream frame synchronization sign and a downstream superframe number in the received downstream data frame.

503. The central office processing device sends the downstream data frame to a terminal processing device.

504. The terminal processing device records the downstream superframe number of the received downstream data frame, caches BWMAP information in the downstream data frame, and starts timing upon receipt of the downstream frame synchronization sign of the downstream data frame.

505. The terminal processing device completes downstream frame synchronization and downstream superframe synchronization by using a downstream frame synchronization sign and a downstream superframe number in the received downstream data frame.

506. The terminal processing device sends an upstream channel-associated data frame to the central office processing device.

An upstream superframe number in the upstream channel-associated data frame is the same as the downstream superframe number in the downstream data frame received in step 505.

The terminal processing device inserts the upstream frame synchronization sign into the upstream channel-associated data frame after receiving the downstream frame synchronization sign of the downstream data frame; or the terminal processing device may insert the upstream frame synchronization sign into the upstream channel-associated data frame after delaying a preset system time after receiving the downstream frame synchronization sign of the downstream data frame. The upstream frame synchronization sign may be the same as the downstream frame synchronization sign or be different from the downstream frame synchronization sign. The upstream frame synchronization sign may be set according to actual requirements and no limitation is set herein.

507. The central office processing device stops timing when receiving the upstream frame synchronization sign of the upstream channel-associated data frame, and obtains a duration.

508. The central office processing device obtains a loop delay between the central office processing device and the terminal processing device.

The central office processing device detects that the downstream superframe number of the received downstream data frame is the same as the downstream superframe number of the downstream data frame recorded in step 504, and uses the duration obtained in step 507 as the loop delay between the central office processing device and the terminal processing device.

509. The central office processing device obtains an equalization delay of the terminal processing device.

510. The terminal processing device receives and sends an upstream service data frame between a determined start time point 5101 and end time point 5102.

511. The central office processing device receives and sends the upstream service data frame between a determined start time point 5111 and end time point 5112.

According to the above description, in the embodiment of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

Figure 6:
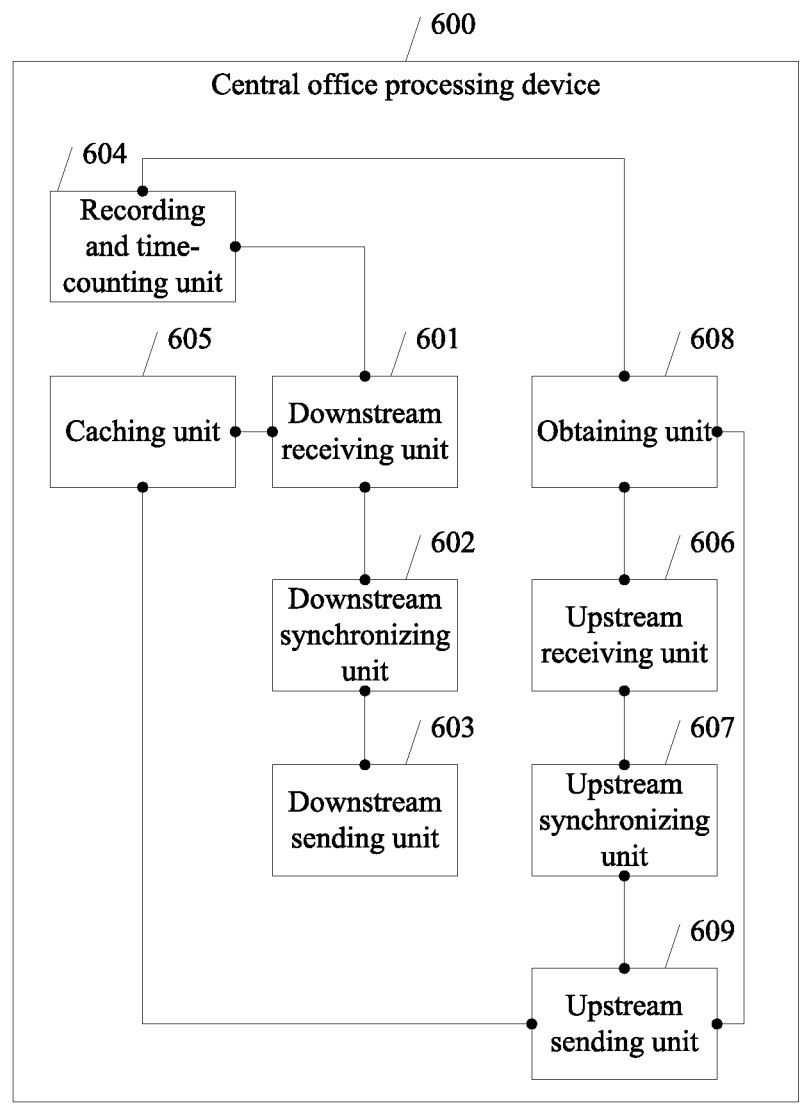
FIG. 6 is a schematic structural diagram of a central office processing device according to an embodiment of the present invention.

A central office processing device in the embodiments of the present invention is described in the following. Referring to FIG. 6, a central office processing device 600 according to an embodiment of the present invention includes: a downstream receiving unit 601, a downstream synchronizing unit 602, a downstream sending unit 603, a recording and timing unit 604, a caching unit 605, an upstream receiving unit 606, an upstream synchronizing unit 607, an obtaining unit 608, and an upstream sending unit 609.

The downstream receiving unit 601 is configured to receive a downstream data frame from an optical line terminal.

The downstream data frame includes a downstream frame synchronization sign, a downstream superframe number, and BWMAP information.

The downstream synchronizing unit 602 is configured to perform frame synchronization and superframe synchronization by using the downstream frame synchronization sign and the downstream superframe number included in the downstream data frame received by the downstream receiving unit 601.

The downstream sending unit 603 is configured to send the downstream data frame received by the downstream receiving unit 601 to a terminal processing device;

The recording and timing unit 604 is configured to record the downstream superframe number of the downstream data frame received by the downstream receiving unit 601, and start timing upon receipt of the downstream frame synchronization sign of the downstream data frame.

The caching unit 605 is configured to cache the BWMAP information of the received downstream data frame.

The upstream receiving unit 606 is configured to receive an upstream channel-associated data frame sent by the terminal processing device.

The upstream channel-associated data frame includes an upstream superframe number and an upstream frame synchronization sign, and the upstream superframe number is the same as the downstream superframe number carried in the downstream data frame received from the central office processing device 600 before the terminal processing device sends the upstream channel-associated data frame; and the upstream receiving unit 606 is configured to receive an upstream service data frame.

In an actual application, the central office processing device and the terminal processing device may establish an associated channel by using a redundant bandwidth for transmitting the upstream channel-associated data frame, and the upstream receiving unit 606 may specifically receive the upstream channel-associated data frame sent by the terminal processing device over the associated channel.

The upstream synchronizing unit 607 is configured to perform upstream frame synchronization and upstream superframe synchronization by using the upstream frame synchronization sign and the upstream superframe number included in the upstream data frame received by the upstream receiving unit 606.

The recording and timing unit 604 is further configured to stop timing when the upstream receiving unit 606 receives the upstream frame synchronization sign of the upstream channel-associated data frame.

The obtaining unit 608 is configured to obtain, according to the downstream superframe number of the downstream data frame recorded by the recording and timing unit 604, the upstream superframe number of the upstream channel-associated data frame received by the upstream receiving unit 606, and a duration from the starting timing to the stopping timing by the recording and timing unit 604, a loop delay between the central office processing device and the terminal processing device, and configured to obtain an equalization delay assigned by the optical line terminal to the terminal processing device.

In an application scenario, the obtaining unit 608 may include a superframe overhead difference obtaining unit and a delay obtaining unit.

The superframe overhead difference obtaining unit is configured to: when the downstream superframe number of the downstream data frame recorded by the recording and timing unit 604 is greater than the upstream superframe number of the upstream channel-associated data frame received by the upstream receiving unit 606, subtract the upstream superframe number of the upstream channel-associated data frame from the downstream superframe number of the downstream data frame recorded by the recording and timing unit 604, to obtain a superframe overhead difference; or when the downstream superframe number of the downstream data frame recorded by the recording and timing unit 604 is smaller than the upstream superframe number of the upstream channel-associated data frame received by the upstream receiving unit 606, subtract the upstream superframe number of the upstream channel-associated data frame from the downstream superframe number of the downstream data frame recorded by the recording and timing unit 604, and then add 2 to the 30th power, to obtain a superframe overhead difference.

The delay obtaining unit is configured to multiply the superframe overhead difference obtained by the superframe overhead difference obtaining unit by 125 microseconds, and then add the duration from the starting timing to the stopping timing by the recording and timing unit 604, to obtain the loop delay between the central office processing device and the terminal processing device.

In an application scenario, when the downstream superframe number of the downstream data frame recorded by the recording and timing unit 604 is the same as the upstream superframe number of the upstream channel-associated data frame, the obtaining unit 608 is specifically configured to use the duration from the starting timing to the stopping timing by the recording and timing unit 604 as the loop delay between the central office processing device and the terminal processing device.

In an actual application, because an OLT normally bears an equalization delay in a physical layer operations, administration and maintenance overhead field, that is, a PLOAM field; therefore, the obtaining unit 608 may obtain an equalization delay assigned by the optical line terminal to the terminal processing device by monitoring a PLOAM field in the downstream data frame received by the downstream receiving unit 601 from the optical line terminal.

The upstream sending unit 609 is configured to determine a start time point and an end time point according to the loop delay and the equalization delay obtained by the obtaining unit 608, and the BWMAP information cached by the caching unit 605, and between the start time point and the end time point, send an upstream service data frame received by the upstream receiving unit 606 between the start time point and the end time point to the optical line terminal.

In an actual application, the central office processing device further includes a resetting unit which is configured to: when a synchronization failure occurs on the downstream synchronizing unit 602 or the upstream synchronizing unit 607, stop sending any data, and clear all cached BWMAP information.

It should be noted that the central office processing device 600 in this embodiment may be the central office processing device in the method embodiments, and may be used to implement all technical solutions in the method embodiments, functions of functional modules thereof may be specifically implemented according to the method in the method embodiments, and reference may be made to relevant description in the embodiments for specific implementation processes thereof, which will not be described repeatedly herein.

According to the above description, in the embodiment of the present invention, a central office processing device obtains a loop delay between the central office processing device and a terminal processing device according to an upstream superframe number and upstream frame synchronization sign in an upstream channel-associated data frame sent by the terminal processing device, and after subtracting the loop delay, the central office processing device, by using cached BWMAP information and the obtained equalization delay of the terminal processing device, accurately determines a start time point and an end time point for sending an upstream service data frame to an optical line terminal, thereby implementing accurate sending control for the upstream service data frame.

Figure 7:
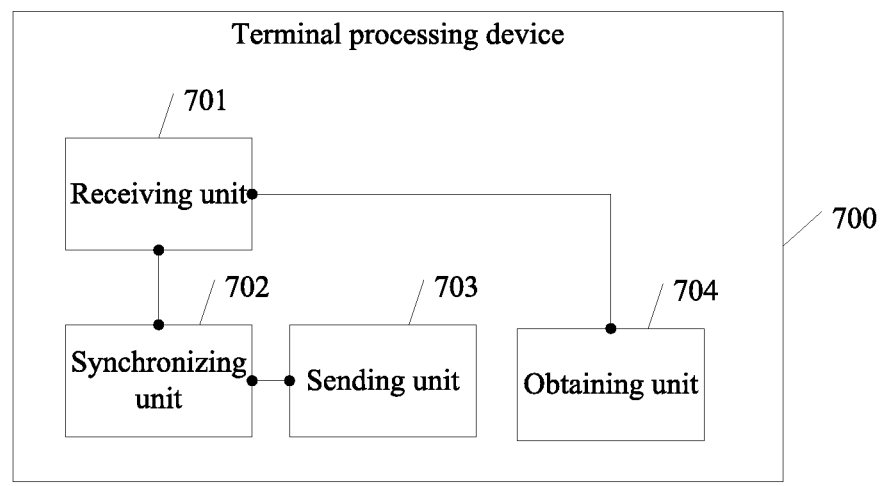
FIG. 7 is a schematic structural diagram of a terminal processing device according to an embodiment of the present invention.

A terminal processing device in the embodiments of the present invention is described in the following. Referring to FIG. 7, a terminal processing device 700 according to an embodiment of the present invention includes: a receiving unit 701, a synchronizing unit 702, a sending unit 703, and an obtaining unit 704.

The receiving unit 701 is configured to receive a downstream data frame from a central office processing device.

The downstream data frame carries a downstream frame synchronization sign, a downstream superframe number, and BWMAP information.

The synchronizing unit 702 is configured to perform frame synchronization and superframe synchronization by using the downstream frame synchronization sign and the downstream superframe number included in the downstream data frame received by the receiving unit 701.

The sending unit 703 is configured to send an upstream channel-associated data frame to the central office processing device.

The upstream data frame includes an upstream superframe number and an upstream frame synchronization sign, and the upstream superframe number is the same as the downstream superframe number carried in the downstream data frame received from the central office processing device before the terminal processing device 700 sends the upstream channel-associated data frame.

In an actual application, the terminal processing device and the central office processing device may establish an associated channel by using a redundant bandwidth for transmitting the upstream channel-associated data frame, and the synchronizing unit 703 may send the upstream channel-associated data frame through the established associated channel.

Further, the sending unit is further configured to determine a start time point and an end time point according to an equalization delay obtained by the obtaining unit 704 and the BWMAP information in the downstream data frame received by the receiving unit 701, and between the start time point and the end time point, send an upstream service data frame received between the start time point and the end time point to the central office processing device.

The obtaining unit 704, configured to obtain the equalization delay assigned by an optical line terminal thereto from the downstream data frame received by the receiving unit 701.

It should be noted that the terminal processing device 700 in this embodiment may be the terminal processing device in the method embodiments, and may be used to implement all technical solutions in the method embodiments, functions of functional modules thereof may be specifically implemented according to the method in the method embodiments, and reference may be made to relevant description in the embodiments for specific implementation processes thereof, which will not be described repeatedly herein.

According to the above description, in the embodiment of the present invention, a terminal processing device, after completing frame synchronization and superframe synchronization by using a received downstream data frame, by sending an upstream channel-associated data frame to a central office processing device, enables the central office processing device to obtain a loop delay between the central office processing device and the terminal processing device by using an upstream superframe number and an upstream frame synchronization sign in the upstream channel-associated data frame sent by the terminal processing device, thereby enabling the central office processing device to, after subtracting the loop delay and by using cached BWMAP information and the obtained equalization delay of the terminal processing device, accurately determine a start time point and an end time point for sending an upstream service data frame to an optical line terminal, which implements accurate control for sending the upstream service data frame.

Persons skilled in the art should clearly understand that, for the convenience and brevity of description, for the specific operation processes of the system, apparatus, and units, reference may be made to the corresponding processes in the method embodiments, which will not be described repeatedly herein. A sequence relationship between steps in the method may be correspondingly adjusted according to an actual application scenario, or multiple steps may also be combined for processing.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated units are implemented in the form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

Detailed above are a method and a device for sending data in a passive optical network over a long distance according to the present invention. Persons of ordinary skill in the art can make modifications to the specific implementation manners and the application scopes according to the ideas of the embodiments of the present invention. Therefore, the content of the specification shall not be construed as a limitation to the present invention.

What is claimed is:

1. A method for sending data in a passive optical network, the method comprising:
   receiving, by a central office processing device, a downstream data frame from an optical line terminal, wherein the downstream data frame carries a downstream frame synchronization sign, a downstream superframe number, and bandwidth map information;
   performing downstream frame synchronization and downstream superframe synchronization by using the downstream frame synchronization sign and the downstream superframe number;
   sending the received downstream data frame to a terminal processing device;
   recording the downstream superframe number of the received downstream data frame;
   caching the bandwidth map information in the downstream data frame;
   starting timing upon receipt of the downstream frame synchronization sign of the downstream data frame;
   receiving an upstream channel-associated data frame sent by the terminal processing device, wherein the upstream channel-associated data frame comprises an upstream superframe number and an upstream frame synchronization sign, and the upstream superframe number is the same as the downstream superframe number carried in the downstream data frame received from the central office processing device before the terminal processing device sends the upstream channel-associated data frame;
   performing upstream frame synchronization and upstream superframe synchronization by using the upstream frame synchronization sign and the upstream superframe number;
   stopping timing when receiving the upstream frame synchronization sign of the upstream channel-associated data frame;
   obtaining a loop delay between the central office processing device and the terminal processing device according to the recorded downstream superframe number of the downstream data frame, the upstream superframe number of the upstream channel-associated data frame, and a duration from the starting timing to the stopping timing;
   obtaining an equalization delay assigned by the optical line terminal to the terminal processing device;
   determining a start time point and an end time point according to the loop delay, the equalization delay, and the bandwidth map information; and
   between the start time point and the end time point, sending an upstream service data frame received between the start time point and the end time point to the optical line terminal.

2. The method according to claim 1, wherein:
the recorded downstream superframe number of the downstream data frame is greater or smaller than the upstream superframe number of the upstream channel-associated data frame; and
obtaining a loop delay between the central office processing device and the terminal processing device specifically comprises:
when the recorded downstream superframe number of the downstream data frame is greater than the upstream superframe number of the upstream channel-associated data frame, subtracting the upstream superframe number of the upstream channel-associated data frame from the recorded downstream superframe number of the downstream data frame, to obtain a superframe overhead difference; and
when the recorded downstream superframe number of the downstream data frame is smaller than the upstream superframe number of the upstream channel-associated data frame, subtracting the upstream superframe number of the upstream channel-associated data frame from the recorded downstream superframe number of the downstream data frame, and then adding 2 to the 30th power, to obtain a superframe overhead difference; and multiplying the superframe overhead difference by 125 microseconds, and then adding the duration, to obtain the loop delay between the central office processing device and the terminal processing device.

3. The method according to claim 1, wherein:
the recorded downstream superframe number of the downstream data frame is the same as the upstream superframe number of the upstream channel-associated data frame; and obtaining the loop delay between the central office processing device and the terminal processing device specifically comprises using the duration as the loop delay between the central office processing device and the terminal processing device.

4. The method according to claim 1, wherein receiving the upstream channel-associated data frame sent by the terminal processing device specifically comprises:
receiving the upstream channel-associated data frame sent by the terminal processing device over an associated channel, wherein the associated channel is a channel established by the central office processing device and the terminal processing device by using an upstream redundant bandwidth.

5. The method according to claim 2, wherein receiving the upstream channel-associated data frame sent by the terminal processing device specifically comprises:
receiving the upstream channel-associated data frame sent by the terminal processing device over an associated channel, wherein the associated channel is a channel established by the central office processing device and the terminal processing device by using an upstream redundant bandwidth.

6. The method according to claim 3, wherein receiving the upstream channel-associated data frame sent by the terminal processing device specifically comprises:
receiving the upstream channel-associated data frame sent by the terminal processing device over an associated channel, wherein the associated channel is a channel established by the central office processing device and the terminal processing device by using an upstream redundant bandwidth.

7. The method according to claim 4, wherein when one of the local downstream frame synchronization and downstream superframe synchronization and the local upstream frame synchronization and upstream superframe synchronization fails, the method further comprising:
stopping sending any data;
clearing all cached bandwidth map information; and
performing downstream frame synchronization and downstream superframe synchronization again.

8. The method according to claim 7, wherein obtaining the equalization delay assigned by the optical line terminal to the terminal processing device specifically comprises:
obtaining the equalization delay assigned by the optical line terminal to the terminal processing device by monitoring a physical layer operations, administration and maintenance overhead field in the downstream data frame received from the optical line terminal.

9. A method for sending data in a passive optical network, the method comprising:
receiving, by a terminal processing device, a downstream data frame from a central office processing device, wherein the downstream data frame carries a downstream frame synchronization sign, a downstream superframe number, and bandwidth map information;

performing local frame synchronization and superframe synchronization by using the downstream frame synchronization sign and the downstream superframe number;

sending an upstream channel-associated data frame to the central office processing device, wherein the upstream channel-associated data frame comprises an upstream superframe number and an upstream frame synchronization sign, and wherein the upstream superframe number is the same as the downstream superframe number carried in the downstream data frame received from the central office processing device before the terminal processing device sends the upstream channel-associated data frame;

obtaining an equalization delay assigned by an optical line terminal thereto from the received downstream data frame;

determining a start time point and an end time point according to the equalization delay and the bandwidth map information in the received downstream data frame; and between the start time point and the end time point, sending an upstream service data frame received between the start time point and the end time point to the central office processing device.

10. The method according to claim 9, wherein sending the upstream channel-associated data frame to the central office processing device specifically comprises:
sending the upstream channel-associated data frame to the central office processing device over an associated channel, wherein the associated channel is a channel established by the terminal processing device and the central office processing device by using an upstream redundant bandwidth.

11. A central office processing device, comprising:
a downstream receiving unit, configured to receive a downstream data frame from an optical line terminal, wherein the downstream data frame carries a downstream frame synchronization sign, a downstream superframe number, and bandwidth map information;

a downstream synchronizing unit, configured to perform frame synchronization and superframe synchronization by using the downstream frame synchronization sign and the downstream superframe number comprised in the downstream data frame received by the downstream receiving unit;

a downstream sending unit, configured to send the downstream data frame received by the downstream receiving unit to a terminal processing device;

a recording and timing unit, configured to record the downstream superframe number of the downstream data frame received by the downstream receiving unit, and start timing upon receipt of the downstream frame synchronization sign of the downstream data frame;

a caching unit, configured to cache the bandwidth map information of the received downstream data frame;

an upstream receiving unit, configured to receive an upstream channel-associated data frame sent by the terminal processing device, wherein the upstream channel-associated data frame comprises an upstream superframe number and an upstream frame synchronization sign, and the upstream superframe number is the same as the downstream superframe number carried in the downstream data frame received from the central office processing device before the terminal processing device sends the upstream channel-associated data frame, and configured to receive an upstream service data frame;

an upstream synchronizing unit, configured to perform upstream frame synchronization and upstream superframe synchronization by using the upstream frame synchronization sign and the upstream superframe number comprised in the upstream data frame received by the upstream receiving unit, wherein the recording and timing unit is further configured to stop timing when the upstream receiving unit receives the upstream frame synchronization sign of the upstream channel-associated data frame;

an obtaining unit, configured to obtain, according to the downstream superframe number of the downstream data frame recorded by the recording and timing unit, the upstream superframe number of the upstream channel-associated data frame received by the upstream receiving unit, and a duration from the starting timing to the stopping timing by the recording and timing unit, a loop delay between the central office processing device and the terminal processing device, and configured to obtain an equalization delay assigned by the optical line terminal to the terminal processing device; and an upstream sending unit, configured to determine a start time point and an end time point according to the loop delay and the equalization delay obtained by the obtaining unit, and the bandwidth map information cached by the caching unit, and between the start time point and the end time point, send an upstream service data frame received by the upstream receiving unit between the start time point and the end time point to the optical line terminal.

12. The device according to claim 11, wherein:
the superframe number of the downstream data frame recorded by the recording and timing unit is greater or smaller than the upstream superframe number of the upstream channel-associated data frame; and
the obtaining unit specifically comprises:
a superframe overhead difference obtaining unit, configured to: when the downstream superframe number of the downstream data frame recorded by the recording and timing unit is greater than the upstream superframe number of the upstream channel-associated data frame received by the upstream receiving unit, subtract the upstream superframe number of the upstream channel-associated data frame from the recorded downstream superframe number of the downstream data frame, to obtain a superframe overhead difference; or when the downstream superframe number of the downstream data frame recorded by the recording and timing unit is smaller than the upstream superframe number of the upstream channel-associated data frame received by the upstream receiving unit, subtract the upstream superframe number of the upstream channel-associated data frame from the recorded downstream superframe number of the downstream data frame, and then add 2 to the 30th power, to obtain a superframe overhead difference; and
a delaying obtaining unit, configured to multiply the superframe overhead difference obtained by the superframe overhead difference obtaining unit by 125 microseconds, and then add the duration, to obtain the loop delay between the central office processing device and the terminal processing device.

13. The device according to claim 11, wherein:
the downstream superframe number of the downstream data frame recorded by the recording and timing unit is the same as the upstream superframe number of the upstream channel-associated data frame; and
the obtaining unit is specifically configured to use the duration as the loop delay between the central office processing device and the terminal processing device.

14. The device according to claim 11, wherein
the upstream receiving unit receives the upstream channel-associated data frame sent by the terminal processing device over an associated channel, wherein the associated channel is a channel established by the central office processing device and the terminal processing device by using an upstream redundant bandwidth.

15. The device according to claim 12, wherein
the upstream receiving unit receives the upstream channel-associated data frame sent by the terminal processing device over an associated channel, wherein the associated channel is a channel established by the central office processing device and the terminal processing device by using an upstream redundant bandwidth.

16. The device according to claim 13, wherein
the upstream receiving unit receives the upstream channel-associated data frame sent by the terminal processing device over an associated channel, wherein the associated channel is a channel established by the central office processing device and the terminal processing device by using an upstream redundant bandwidth.

17. The device according to claim 14, further comprising:
a resetting unit, configured to: when a synchronization failure occurs on the downstream synchronizing unit or the upstream synchronizing unit, stop sending any data, and clear all cached bandwidth map information.

18. The device according to claim 17, wherein the obtaining unit specifically obtains the equalization delay assigned by the optical line terminal to the terminal processing device by monitoring a physical layer operations, administration and maintenance overhead field in the downstream data frame received by the downstream receiving unit from the optical line terminal.

19. A terminal processing device, comprising:
a receiving unit, configured to receive a downstream data frame from a central office processing device, wherein the downstream data frame carries a downstream frame synchronization sign, a downstream superframe number, and bandwidth map information;
a synchronizing unit, configured to perform frame synchronization and superframe synchronization by using the downstream frame synchronization sign and the downstream superframe number comprised in the downstream data frame received by the receiving unit;
a sending unit, configured to send an upstream channel-associated data frame to the central office processing device, wherein the upstream data frame comprises an upstream superframe number and an upstream frame synchronization sign, and the upstream superframe number is the same as the downstream superframe number carried in the downstream data frame received from the central office processing device before the terminal processing device sends the upstream channel-associated data frame; and
an obtaining unit, configured to obtain an equalization delay assigned by an optical line terminal thereto from the downstream data frame received by the receiving unit;

wherein the sending unit is further configured to determine a start time point and an end time point according to the equalization delay obtained by the obtaining unit and the bandwidth map information in the downstream data frame received by the receiving unit, and between the start time point and the end time point, send an upstream service data frame received between the start time point and the end time point to the central office processing device.

20. The device according to claim 19, wherein the sending unit specifically sends the upstream channel-associated data frame to the central office processing device over an associated channel, wherein the associated channel is a channel established by the terminal processing device and the central office processing device by using an upstream redundant bandwidth.

* * * * *